March 27, 1934.　　　F. LJUNGSTRÖM　　　1,952,324
BRAKE
Filed June 6, 1931　　　3 Sheets-Sheet 1
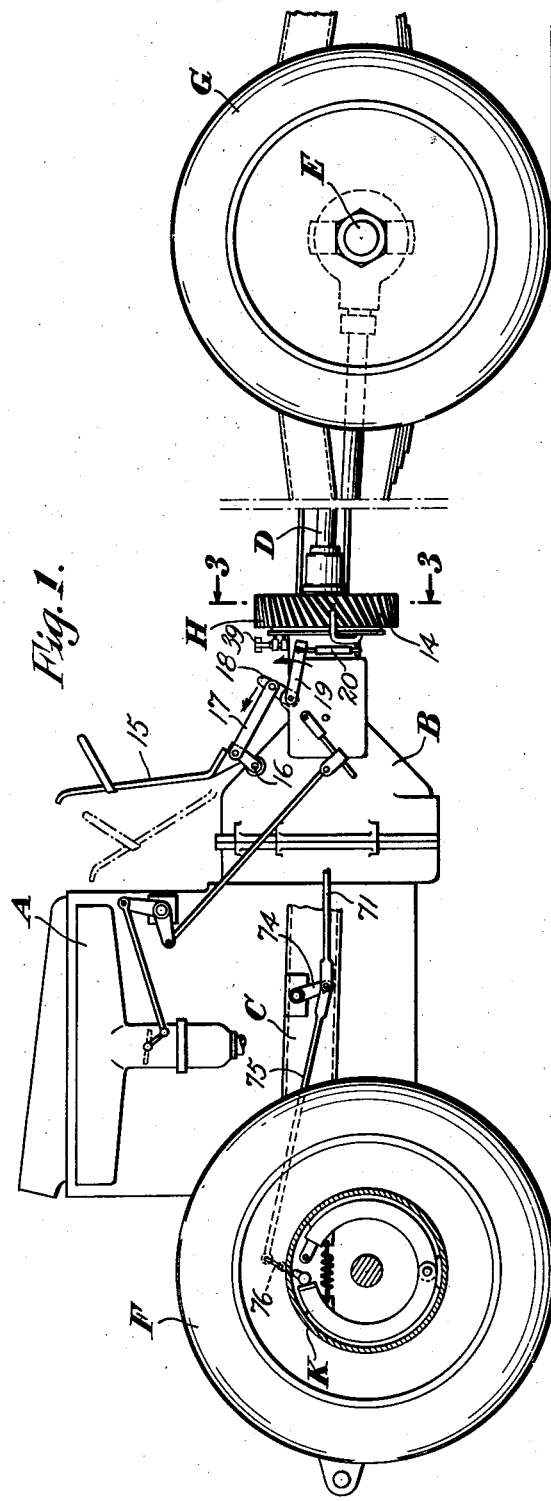
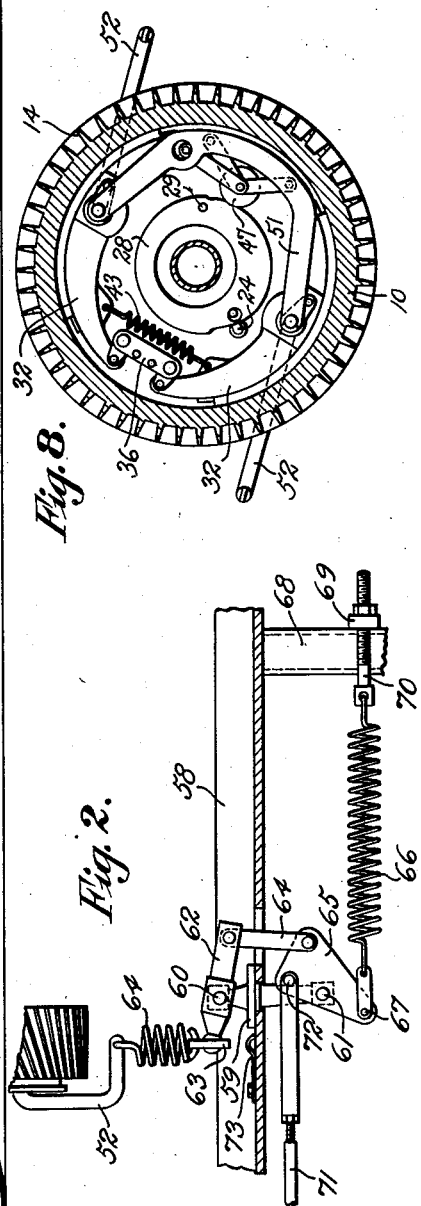
INVENTOR
Fredrik Ljungström
BY
his ATTORNEY March 27, 1934.  F. LJUNGSTRÖM  1,952,324
BRAKE
Filed June 6, 1931  3 Sheets-Sheet 2
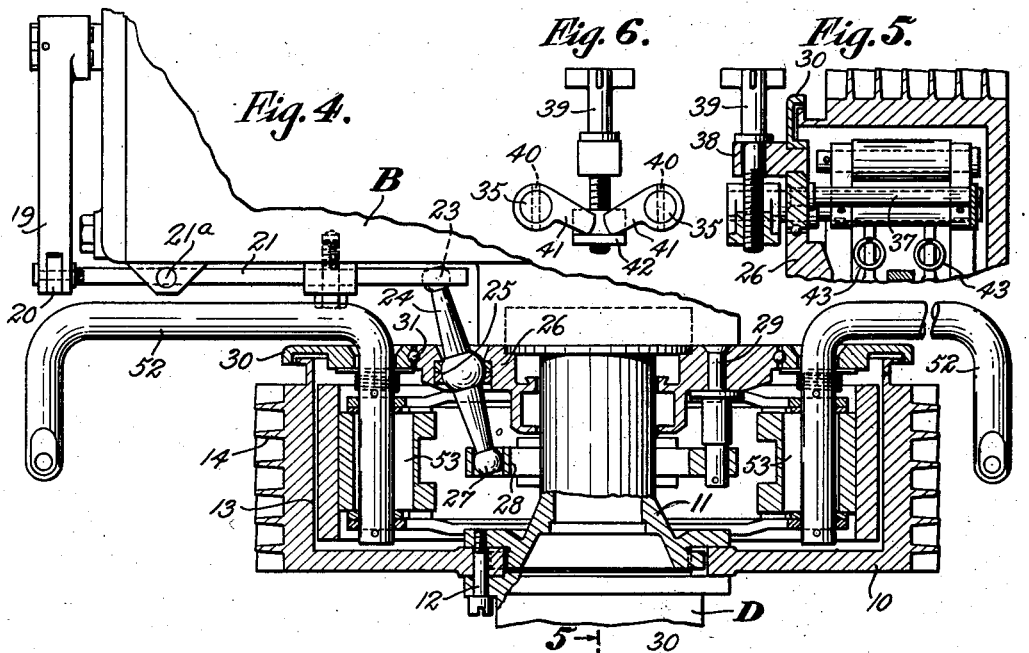
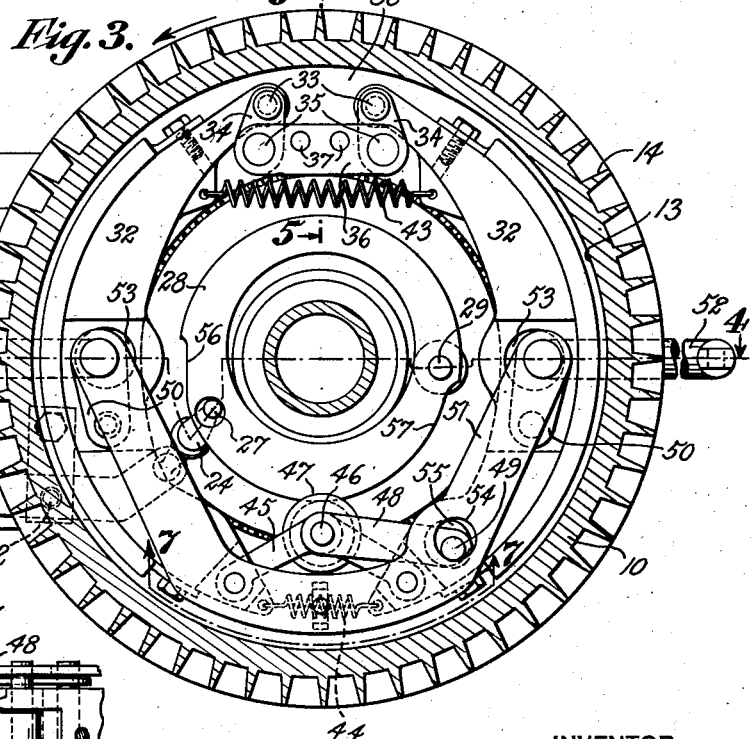
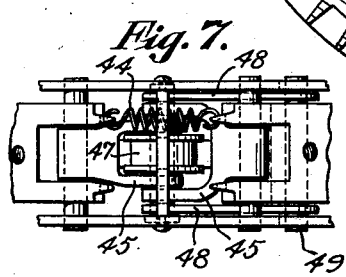
INVENTOR
Fredrik Ljungström
BY
his ATTORNEY March 27, 1934.  F. LJUNGSTRÖM  1,952,324

BRAKE

Filed June 6, 1931  3 Sheets-Sheet 3

INVENTOR
Fredrik Ljungström
BY
Wm T. Hedlund
his ATTORNEY

Patented Mar. 27, 1934

1,952,324

UNITED STATES PATENT OFFICE 1,952,324

BRAKE

Fredrik Ljungström, Lidingo, Sweden, assignor, by mesne assignments, to Ped, Incorporated, New York, N. Y., a corporation of Delaware Application June 6, 1931, Serial No. 542,542
In Sweden April 10, 1929

6 Claims. (Cl. 188—140)

This application is a continuing application replacing my copending application Serial No. 392,083, filed September 12, 1929, and is also a continuing application with respect to my copending application Serial No. 411,709, filed December 5, 1929 (Patent No. 1,923,102, granted August 22, 1933), and is to be considered as relating back to the aforesaid applications so far as herein continued for all dates and rights incident to the filing thereof.

My invention relates to brakes and has particular reference to brakes for wheeled vehicles such as automobiles and the like. Amongst the objects of my invention are; to provide improved brake mechanism capable of exerting powerful braking action through utilization of the inertia of the moving vehicle whereby such braking action may be obtained with the use of comparatively little force from the brake actuating member; to provide brake mechanism of the above general character in which self-limiting brake parts are incorporated, whereby to automatically prevent over-braking; to provide a brake mechanism in which the maximum braking force applied thereby bears a definite relation to the position of the brake applying member; to provide a vehicle brake mechanism in which a primary propeller shaft brake provides the sole actuating means for a secondary wheel brake, and in which each of the brakes provides a maximum braking force bearing a definite relation to the position of the brake applying member, and to provide brake mechanism of the above stated general character which operates to provide self-limiting brake action irrespective of the direction of rotation of the parts to which retarding force is applied by the brake mechanism.

The invention will be explained in detail in connection with the accompanying drawings forming part of this specification and showing a preferred embodiment of the invention. Further objects and the nature and advantages of the invention will appear as the description proceeds.

In the drawings;

Fig. 1 is a diagrammatic side elevation of an automobile chassis equipped with a brake embodying the present invention, certain parts being broken away for clearness;

Fig. 2 is a plan view of a part of the chassis shown in Fig. 1;

Fig. 3 is a section on an enlarged scale taken on the line 3—3 of Fig. 1;

Fig. 4 is a section taken on the line 4—4 of Fig. 3;

Fig. 5 is a section taken on the line 5—5 of Fig. 3;

Fig. 6 is a side elevation of a part of Fig. 5, looking from the left of the latter figure;

Fig. 7 is a section taken on the line 7—7 of Fig. 3;

Fig. 8 is a small scale section similar to Fig. 3 showing the parts in a different position;

Figure 9:
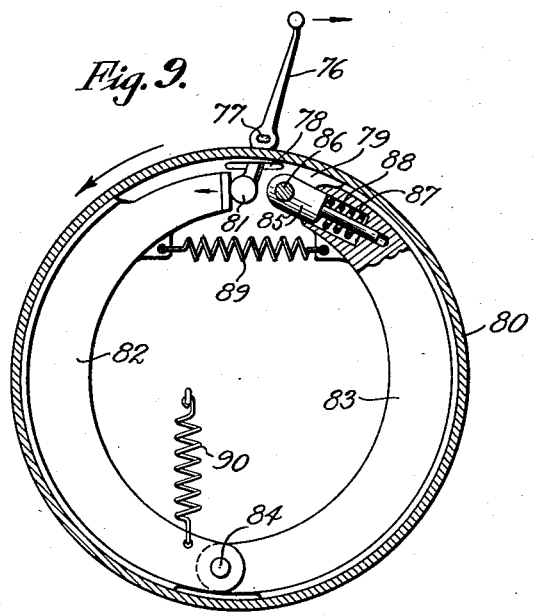
Fig. 9 illustrates in partial section and on a larger scale the wheel brake mechanism shown in Fig. 1.

Referring now to the drawings, the chassis illustrated in Fig. 1 comprises a motor A and a transmission B mounted in the usual frame indicated generally at C. The transmission B transmits power to the propeller shaft D and to the rear axle E through the usual speed reducing rear axle gears. The frame C is mounted in the usual manner upon front wheels F and rear wheels G, the latter in the present instance being the driving wheels.

The brake mechanism comprises a primary brake indicated generally at H and mounted so as to rotate with the propeller shaft D and a secondary brake indicated generally at K, which in the present instance comprises wheel brakes acting on the front wheels of the vehicle. The front wheel brakes are alike and each of these brakes is connected to the primary brake in the same manner. It will therefore be sufficient to describe only one of the front wheel brakes.

Referring now more particularly to Figs. 3 and 4, the primary brake H comprises a brake drum 10 secured to the end of the driven shaft 11 of the transmission B to which is also secured by means of studs 12 the forward end of propeller shaft D. Drum 10 provides an inner cylindrical surface 13 adapted to be contacted by internal expanding brake shoes and the outer surface of the drum around the inner surface 13 is provided with a plurality of oblique cooling ribs 14, the specific arrangement and action of which will be explained later. The brake actuating mechanism comprises a pedal 15 (see Fig. 1) pivotally mounted at 16 to the housing of the transmission B and connected by means of link 17 and levers 18 and 19 to the adjustable link 20. In the embodiment illustrated, levers 18 and 19 are not directly connected but are connected through the medium of spring actuated brake applying mechanism as disclosed in United States Patent No. 1,810,283 granted to me June 16, 1931, to which patent reference may be had for details of construction. It will be evident that other specific forms of brake applying mechanism may be utilized within the scope of the present invention. Link 20 is pivotally connected to lever 21 (see Fig. 3) the latter being pivoted intermediate its ends around a pin 22 fixed with respect to the transmission casing. The end of lever 21 opposite the end connected to link 20 is joined by means of a ball and socket connection 23 to one end of lever 24. Lever 24 is mounted intermediate its ends in a socket 25 formed in an annular plate like member 26 fixed to the end of the transmission casing. The end of lever 24 opposite that which is connected to lever 21 is secured by means of a second ball and socket connection 27 to a brake actuating member 28 which in the form illustrated is an annular ring surrounding the shaft 11 and pivoted to the fixed pin 29 riveted in the plate member 26.

The periphery of member 26 provides a bearing surface adapted to rotatably carry an annular ring 30 which closes the space between plate 26 and the outer cylindrical portion of drum 10. In the embodiment illustrated ring 30 is carried on bearing balls 31 running in grooves formed in the outer periphery of plate 26 and the inner periphery of ring 30.

Mounted within drum 10 is a pair of internal expanding brake shoes 32, these shoes being pivoted at their upper ends on pins 33 carried by links 34. Links 34 are fixed to pins 35 journalled in the ring 30. As may be seen from Fig. 5 the ends of pins 35, remote from ring 30 are held in spaced relation by the plate 36 which is in turn carried by pins 37 riveted in ring 30. Ring 30 has riveted thereto a pin 38 through which an adjusting screw 39 passes. The ends of pins 35 which are journalled in ring 30 project through this ring and the projecting ends have pinned thereto by means of pins 40 the levers 41, these levers being adapted to be turned simultaneously in opposite directions by movement of an adjusting block 42 threaded on the lower end of the adjusting screw 39. As will be evident from Fig. 1, the adjusting screw 39 is in a position permitting unusual facility for adjustment of the position of the brake shoe to compensate for wear, since this adjustment is readily accessible through a suitable opening in the floor boards of the body of the vehicle (not shown).

The upper ends of brake shoes 32 are drawn toward each other by the brake retracting springs 43 and the lower ends of the shoes are drawn toward each other by the retracting springs 44. Retraction of the brake shoes by these springs tends to cause movement of the brake linkage so that the left hand end of lever 21 (as viewed in Fig. 3) rises and fully retracted position of the mechanism is determined by contact of this lever with the stop 21a which is advantageously made adjustable.

Adjacent to their lower ends each of the brake shoes 32 is connected by means of pivoted forked links 45 (Fig. 7) to a pin 46 (Fig. 3) upon which pin is mounted the roller 47. Roller 47 is flanged as shown in Fig. 7 and the groove between the flanges on the roller is engaged by the circumference of the actuating ring 28. Pin 46 upon which roller 47 is mounted is connected by means of the links 48 to pin 49, this pin being riveted to ring 30.

Intermediate their ends the brake shoes 32 are connected through pivot links 50 to the ends of a pair of U-shaped spacing members 51. The ends of members 51 are pivotally connected to the inner ends of a pair of brake draw-rods 52 which pass through diametrically opposite holes in the annular ring 30 and through openings 53 in the brake shoes 32. As will be seen from Figs. 3 and 4 openings 53 provide considerable clearance space around the portions of the draw-rods passing through the brake shoes.

Openings 54 are also provided in the U-shaped members 51 and an opening 55 is provided in the right hand brake shoe 32. Pin 49 passes through these openings, which are large enough to provide considerable clearance space around the pin as is evident from Fig. 3.

The outer circumference of the brake actuating ring 28 is irregular in outline, the contour of the lower half of the circumference being such that as roller 47 moves to either side of the position shown in Fig. 3 it will also, in following the circumference of the ring, move radially toward the axis of rotation of the brake drum. The actual contour of ring 28 is very nearly circular so that the inward movement of roller 47 is relatively slight. In order, however, to make the action of this part of the apparatus clear, the curvature of the circumference of the ring away from that of a true circle has been exaggerated near the portions of the ring lying approximately 90° from the bottom thereof, depressions or notches 56 and 57 of exaggerated depth being shown.

The cylindrical portion of drum 10 is provided on its exterior surface with a plurality of axially oblique radiating fins or ribs 14, which as shown in Fig. 1 are arranged at an angle such that the leading ends of the ribs with respect to the direction of rotation of the drum are also leading ends with respect to the direction of motion of the vehicle. In Fig. 1 the chassis illustrated is intended to represent the conventional arrangement in which the motor turns in clock-wise direction as viewed from the front so that when the vehicle is moving forwardly or to the left as seen in Fig. 1 the brake drum is rotating in clockwise direction as viewed from the left of Fig. 1. Such being the case it will be evident that if the vehicle is moving in forward direction the front ends of ribs 14 will lead with respect to both rotary movement of the drum and its translation relative to the ground. Conversely, if the vehicle is moving in backward direction the propeller shaft and brake drum will move in counter-clockwise direction as viewed from the left of Fig. 1 and the rear ends of ribs 14 will lead with respect to both rotary movement of the drum and its translation relative to the ground.

Referring now to Figs. 1 and 2, the connection from the primary brake H to one of the front wheel brakes is shown. On each side member 58 of the vehicle frame C there is mounted, approximately opposite the drum 10, a hanger 59 providing two fixed vertical pivots 60 and 61. A lever 62 is pivoted intermediate its ends about the pivot 60, one end of this lever being connected by means of a spherically mounted link 63 and a coil spring 64 to the outer end of one of the draw-rods 52.

The opposite end of lever 62 is connected by the pivoted link 64, which passes through a suitable aperture in the frame member 58, to one corner of a triangular plate 65. Plate 65 is pivotally mounted adjacent to its center about the pivot pin 61. A coil spring 66 connects a pivot 67 at the outer corner of plate 65 with an anchor member 68 secured to frame 58. The tension of spring 66 may be adjusted by means of the adjusting nut 69 on a bolt 70 passing through the anchor member 68 and attached to one end of the spring.

One end of brake rod 71 is pivoted about a pin 72 at the third corner of plate 65. A resilient spring abutment 73 is secured to the inner side of frame member 58 for a purpose to be described. Brake rod 71 is pivotally connected to an intermediate supporting arm 74 and to another brake rod 75. The forward end of rod 75 is connected to an operating lever 76 (see Fig. 9), adapted to pivot at 77 about a pin supported from an anchorage fixed on the front axle and passing through a slot 78 in the fixed plate 79 which serves as a closure for the front wheel brake drum 80.

Lever 76 is provided within the brake drum with a cam end 81 adapted to engage one end of a brake shoe 82. In the form of brake chosen for illustrative purposes, the wheel brake is of the two shoe self-energizing type comprising the shoe 82 engaged by the cam 81 and a second shoe 83, these shoes being pivotally connected by means of the floating pivot 84. Shoe 83 is secured at its upper end to the fixed plate 79 by means of a yielding connection comprising a plunger 85 pivoted on pin 86, said pin being fixed to plate 79. Plunger 85 is adapted to slide in a recess 87 provided in the end of shoe 83 and a spring 88 located in the recess tends to force the upper end of shoe 83 away from the plunger 85. A coil spring 89 acts to draw the upper ends of brake shoes 82 and 83 together and a second spring 90 acts to prevent dragging of the brake shoes when they are in released position.

The above described wheel brake mechanism has been illustrated in somewhat diagrammatic form since the specific type of brake employed may be varied within the scope of the present invention. The essential feature of the brake insofar as the present invention is concerned resides in the resilient mounting of the brake shoe mechanism with respect to the terminal abutment formed by the pin 86, which pin absorbs the entire reaction force produced by contact of the brake shoe assembly with the drum 80.

Figure 10:
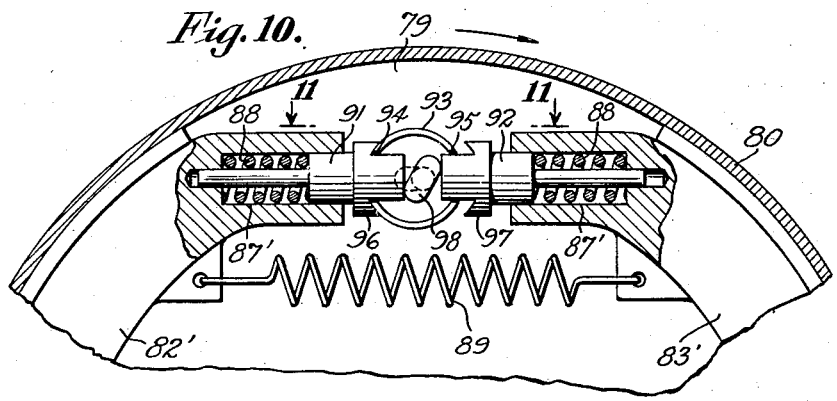
Fig. 10 illustrates on an enlagred scale a modified form of wheel brake mechanism.

In Fig. 10 a modified form of wheel brake is illustrated. In this form a resilient connection is provided between the upper end of each of the brake shoes and the member acting to absorb the reaction force due to braking. The brake shoes 82' and 83' are recessed at their upper ends as at 87' to receive plungers 91 and 92 respectively, these plungers seating against springs 88 located in the recesses 87'.

The fixed plate 79 has secured thereto an inwardly extending tubular abutment 93 having slots 94 and 95 therein through which the inner ends of plungers 91 and 92 are adapted to slide respectively, plungers 91 and 92 being provided with shoulders 96 and 97 respectively, adapted to abut against the abutment 93.

Between the inner ends of the plungers 91 and 92 there is located the brake actuating cam 98, this cam being carried at the inner end of rod 99, which adjacent to its outer end is mounted in a ball and socket bearing 100, the latter being carried at the end of a tubular extension 101 fixed to the plate 79. The outer end 102 of rod 99 is square or otherwise suitably formed to have secured thereto a brake actuating lever similar to lever 76 for turning the rod and cam 98.

As hereinbefore stated, the brake mechanism is, in the embodiment illustrated, spring actuated, that is, the brakes are applied by a brake actuating spring and released by manual operation on the part of the operator. In the position of the parts shown in Fig. 1, the pedal 15 is shown in full lines in the position to which it is moved under the influence of the brake applying spring, and with the pedal in this position the brakes are applied. To release the brakes pedal 15 is depressed toward the position indicated in dotted lines in Fig. 1 and when this action takes place, the brakes are released. In order to understand the operation of the braking mechanism in effecting braking, let it be assumed that the pedal 15 in Fig. 1 is depressed from its full line position so that the brakes are released. If, now, the pedal is permitted to move in clockwise direction, the mechanism disclosed in Patent No. 1,810,283 acts to cause the lever 19 to also move in clockwise direction, thus moving link 20 downwardly. This motion of link 20 causes the left-hand end (as viewed in Fig. 3) of lever 21 to be depressed and raises the opposite end of this lever and the end 23 of lever 24. This causes the end 27 of lever 24 to be depressed and causes depression of the actuating ring 28. Depression of actuating ring 28, which pivots about the fixed pin 29, depresses roller 47 and spreads the forked links 45 to bring the brake shoes 23 into contact with the drum. If the vehicle is moving in forward direction with the drum rotating in the direction of the arrow shown in Fig. 3, contacting of the brake shoes with the drum will cause the entire brake shoe assembly including ring 30 to be turned in counter-clockwise direction as viewed in Fig. 3 toward the position shown in Fig. 8. The braking reaction is taken up through the draw rods 52 and springs 64, the resilience of the latter permitting the brake shoe assembly in the primary brake to turn.

As the brake shoe assembly turns, roller 47 will move along the circumference of the non-rotatable brake ring 28, which, as previously noted, is not parallel to the inner circumference of the drum but curves radially inward away from the drum circumference. Therefore, if for any reason the brake shoes 32 tend to grab, their continued movement in the direction of rotation of the drum will cause the roller 47 to move toward or into the depression 57, thereby relieving the applying pressure on the shoes, (assuming that the actuating ring 28 remains in stationary position). It will thus be seen that if the actuating ring is depressed a given amount the brake assembly will turn to a predetermined braking position, affording a definite amount of braking force which will not be exceeded. If additional braking force is desired, further depression of ring 28 will cause the brake shoe assembly of the primary brake, which may conveniently be termed a brake carriage, to rotate further to a new position having a definite relationship to the position of the brake actuating ring. It will thus be seen that the primary brake provides what may be termed a follow-up action in that if increased braking action is desired it can only be secured by following up the movement of the brake carriage, once it has reached a position of equilibrium, by further movement of the brake actuating ring.

If the vehicle is moving in reverse or backward direction, so that the brake drum is rotating in clockwise direction as viewed in Fig. 3, depression of the brake ring to bring the shoes in contact with the drum will cause the brake carriage to rotate in clockwise direction with the roller 47 approaching the depression 56 in the actuating ring. The action of the brake in automatically releasing itself in case the shoes tend to grab or otherwise exert too great a braking force for a given pedal position is the same in either direction of drive.

As will readily be understood from Fig. 8, the braking action of the primary brake produces a force couple due to braking reaction. It is to be noted that the reaction forces produced by braking action in the primary brake are balanced and are transmitted to the side members of the vehicle frame so that no unbalanced force or twisting moments are applied to the transmission and motor assembly, thereby relieving this mechanism from all twisting strains due to braking.

The force couple produced by braking action of the primary brake is utilized to actuate the secondary brake which in the present instance comprises the front wheel brakes. In order to apply the braking forces to the different wheels in the vehicle in the most efficient manner, I prefer to apply the brakes serially, that is, to apply the primary brake first and the secondary brake later. By doing this the initial braking force is applied to the rear wheels by the primary brake through the propeller shaft and rear axle. The initial braking applied to the rear wheels causes the effective center of gravity of the vehicle to shift forwardly (assuming the vehicle to be moving in forward direction) due to deceleration of the vehicle and to the braking reaction. This shift in the effective center of gravity in the vehicle increases the adhesion of the front wheels and permits the application of relatively heavy braking force to these wheels without danger of causing them to lock and skid due to lack of the proper amount of traction.

In order to obtain the application of braking force first to the rear wheels and then to the front wheels I make use of the mechanism illustrated in Fig. 2. It will be evident from this figure that braking will not be effected on the front wheel until the brake rod 71 is actuated. This rod is held in retracted position by means of the retracting spring 66, the tension of which is adjustable. By adjusting spring 66 so that its tension is greater than the initial tension of spring 64, it will be evident that the primary brake can be actuated and a braking force applied to the rear wheels corresponding to a predetermined reaction force in the spring 64 before the tension in spring 66 is overcome and movement of the front wheel braking rod 71 is effected. When the braking force applied to the primary brake exceeds the predetermined figure governed by the initial tension of spring 66, the force due to braking reaction from the primary brake is translated into movement of the brake rod 71 through the lever system 62, 64 and 65.

Turning now more particularly to Fig. 9, it will be seen that movement of the brake lever 76 in the direction of the arrow, due to movement of brake rod 71, will cause the brake shoe 82 to be applied to the wheel brake which it is assumed is moving in forward direction as indicated by the arrow in the figure. Shoe 82 acts to bring shoe 83 into contact with the drum and the braking reaction from these shoes is taken by the terminal abutment pin 86. If either or both of these shoes tend to grab or to exert a greater braking force than is desired, the increased braking reaction due to such increased braking force will cause spring 88 to be compressed. This will permit a slight turning movement of the entire brake shoe assembly with respect to the fixed portions of the brake mechanism and will consequently relieve the pressure exerted by the cam 81 on shoe 82. This action is similar in effect to the action which takes place in the primary brake and results in the brake stabilizing itself for any given position of the actuating lever 76. In the case of this brake there is also the same follow-up action as in the primary brake. Increased braking force above a given value can be secured only by follow-up movement of the lever 76. In connection with the resilient spring abutment illustrated in this figure it is to be noted that this resilient abutment reduces the period of natural vibration of the brake assembly below the audible, thereby eliminating the highly objectionable noise due to such vibration, which often accompanies the application of vehicle brakes of this general type. In the brake shown in Fig. 9 the resilient abutment is provided for only one direction of movement of the vehicle wheel.

Figure 11:
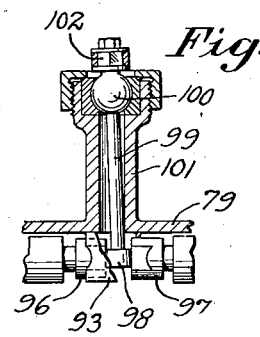
Fig. 11 is a view taken on the line 11—11 of Fig. 10.

Fig. 10 illustrates a modified form of brake in which the resilient abutment is provided for both directions of movement of the wheel. In this form of the apparatus the member 93 forming the fixed abutment is contacted by either one or the other of the plungers 91 or 92 and the brake applying force is applied through the plunger and spring associated with the shoe which acts as the primary brake applying shoe. As illustrated in the figure the brake is shown applied to a drum moving in a direction corresponding to reverse drive of the vehicle shown in Fig. 1. In this case the shoe 83' acts as the primary shoe and the resilient abutment for taking the braking reaction is provided by the spring 88 acting on plunger 91, the latter being in contact with the fixed abutment member 93. In order to permit the movement necessary for the contacting of either plunger 91 or plunger 92 with the abutment member 93 it is necessary for the cam 98 to have some lateral movement. This lateral movement can be provided in any suitable manner and in Fig. 11 I have illustrated one means for providing this motion. In the illustrated embodiment the cam is placed at some distance from the ball and socket mounting 100 which permits lateral movement of the cam without appreciable lateral movement of the brake actuating rod connected at 102 close to the ball mounting 100. Cam 98 may therefore move laterally the required relatively small distance without adversely affecting the adjusting of the secondary brake with respect to the primary brake.

The above described braking system is particularly well adapted for continuous braking under heavy load and is capable of meeting the requirements imposed upon brakes for vehicles employing free wheeling transmissions, which do not ordinarily contemplate the use of the engine as a means for braking the vehicle. The capacity of the brake to sustain heavy continuous braking loads is due in a large measure to the relatively great heat dissipating capacity of the primary brake. The capacity of the primary brake is in a large measure due to the form and arrangement of the cooling fins 14 on the drum 13. By applying internal expanding brake shoes the heat generated in the drum is conducted through an extremely short path to the surface which acts as a heat dissipating area. This surface is relatively large and moves rotationally at relatively high velocity due to the fact that the ordinary propeller shaft is geared so as to rotate at several times the speed of the vehicle wheels.

Whenever the drum rotates it also has movement of translation due to movement of the vehicle and the natural tendency of the air to flow axially of the drum. By placing the ribs in the oblique manner illustrated with the leading ends of the ribs in advance with respect to both the motion of rotation and motion of translation, the most efficient flow of cooling air over the drum is obtained.

This may best be illustrated by a concrete example. Let it be assumed that the side of the vehicle wheels, the ratio of the driving gears and the diameter of drum 18 are such that the peripheral speed of the drum is the same as the speed of the movement of the vehicle. Let it further be assumed that the ribs 14 are disposed at an angle of 45 degrees to the axis of rotation of the drum. Under these conditions it will be evident that the air entering the passages between ribs 14 will not be deflected but will move axially past the drum. Further, it will be seen that the air in moving axially a distance equal to the width of the drum, which may be assumed as unity, will pass from end to end of the channels formed between ribs 14. The length of these channels is, however, equal to the $$\sqrt{2}$$

times the width of the drum, so that while the velocity of the air in axial direction is not increased under the conditions assumed, its speed of flow with respect to the walls of the channels through which it passes is materially increased. This increase in the speed of the air past the heat-radiating surface materially enhances the rapidity of heat transfer, and increases to a marked degree the cooling efficiency of the device.

The above example is theoretical, however, since it is based on a movement of the drum through a body of still air. In practice, such air conditions will rarely if ever exist, and a most important advantage of my invention lies in the fact that efficient air flow is obtained under variable actual operating conditions.

The manner in which air flow is induced may best be understood by considering the action which takes place with the drum rotating but not moving axially. Under this condition air is thrown outwardly from the drum in radial direction, due to centrifugal force, and this action causes a partial vacuum to be formed in the channels between the ribs, which in turn induces air to flow into the forward ends of the channels to replace the air which has been thrown out by centrifugal force. Due to the oblique positioning of the ribs, the entering air is forced axially through the channels by what may be termed a screw action, which results in a constant and regular air flow over the entire cooling surface, such flow being axial until centrifugal force set up by deflection of the air causes the air to be thrown radially from the drum surface.

The examples given above illustrate two extreme cases, in one of which there is no lateral displacement or deflection of the air and in the other of which the maximum lateral deflection of the air takes place. In both cases it is seen that a regular air flow through the channels is produced, giving a maximum cooling effect.

Obviously, relative axial and rotational drum speeds other than those taken by way of illustration, as well as different angles of obliquity of the ribs, will result in different rates of radial flow of air from the drum surface and consequently in different rates of air flow through the channels, but in all cases the general character of the air flow remains substantially the same.

The relation of the axial speed of the drum to its speed of rotation, and also the angle of obliquity of the ribs, may therefore be varied between wide limits without departing from the scope of the invention.

As previously mentioned, the brakes embodying the present invention are particularly useful in vehicles employing free wheeling transmissions and in the present instance the brake has been illustrated as applied in a vehicle equipped with such transmission. The transmission is fully disclosed in my copending application, Serial No. 411,709 with respect to which the present application is a continuation in part. In the transmission and control system illustrated in said application Serial No. 411,709, the brake and throttle controls are consolidated and the pedal control, for reasons not pertinent to the present invention, is opposite from the usual arrangement in that the brake is released by depression of the pedal rather than being applied by such motion. For this reason the pedal 15 is connected to the actuating lever 19 through mechanism (shown in Patent No. 1,810,283) which causes simultaneous movement of levers 18 and 19 in the directions of the arrows shown on these levers in Fig. 1. It will thus be seen that depression of pedal 15 will cause the actuating lever 19 to be raised to effect release of the brake and movement of the pedal 15 upwardly will cause the brake lever 19 to be turned in clockwise direction to cause application of the brake in the manner already described. This particular control means forms no part of the present invention and it will be readily understood that any suitable form of control mechanism may be utilized for actuating the brake ring 28. Upon release of the primary brake, after application thereof, the brake carriage is returned from a position such as that shown in Fig. 8 to that shown in Fig. 3 by the action of springs 66 and 64, and the spring abutment members 73 serve at such time to prevent jar due to members 63 striking the side frame members 58.

When a control system such as is illustrated is employed, a brake applying spring is used for moving the brake lever 19 when foot pressure is taken from the pedal 15. When a conventional braking control is used in which brake applying force is applied manually by the operator, the brake applying spring is not required.

Due to the fact that the secondary brakes embody the follow-up feature which has been described, I prefer to use the U-shaped members 51 in the primary brake, which operate to maintain a constant distance between the inner ends of the brake draw rods 52 regardless of wear on the brake shoes 32. It will be evident from inspection of Fig. 3 that the arrangement illustrated permits the brake shoes 32 to wear without disturbing the adjustment between the draw rods 52, which would not be the case if these rods were pivoted directly to the brake shoes.

In a brake system embodying the present invention, braking by the secondary brake is effected solely due to actuation from the primary or servo brake. With this arrangement effective and powerful braking action may be applied with a minimum amount of effort in the way of pedal pressure or the like on the part of the operator and, in accordance with the present invention, the full application of braking force by the secondary brake may be effected because of the follow-up action of both the primary brake and the secondary brake. This action positively prevents the possibility of over-braking and these brakes may be termed self-limiting brakes since they automatically limit the amount of braking force which they will apply to an amount definitely corresponding to a given position of the control member for the primary brake, which constitutes the sole control member for the entire brake system.

While I have described the best form of the present invention of which I am aware, it will be obvious that the principles of the invention may be carried into effect with apparatus of different form and arrangement from that shown herein by way of illustration and it will also be evident that certain features of the invention may be used to the exclusion of others.

What I claim is:

1. In a wheeled vehicle, a propeller shaft, a primary brake on said propeller shaft, a secondary brake comprising a wheel brake, manually operable means for applying said primary brake and means for initiating application of the secondary brake due to braking reaction from the primary brake, each of said brakes being of the self-limiting type and comprising brake shoe elements automatically operable to limit the maximum braking force which can be applied by the brake for each position of the brake applying means.

2. In a wheeled vehicle, a propeller shaft, a primary brake on said propeller shaft, a secondary brake comprising a wheel brake, manually operable means for applying said primary brake and means for causing application of the secondary brake due to braking reaction from the primary brake, the last mentioned means constituting the sole actuating means for the secondary brake and each of said brakes comprising self-limiting brake shoe means automatically operable to limit the maximum braking force which can be applied by the brake for each position of the brake applying means.

3. In a wheeled vehicle, a propeller shaft, a primary brake on said propeller shaft, manually operable means for applying said brake, said brake comprising self-limiting brake shoe elements automatically operable to limit the maximum braking force which can be applied by the brake in either direction of rotation of said propeller shaft for each position of the brake applying means, a secondary brake comprising a wheel brake, said secondary brake comprising self-limiting brake shoe elements automatically operable to limit the maximum braking force which can be applied by the secondary brake for each position of brake applying means and means for applying said secondary brake due to braking reaction from the primary brake.

4. In a wheeled vehicle, a propeller shaft, a primary brake on said propeller shaft, manually operable means for applying said brake, said brake comprising self-limiting brake shoe elements automatically operable to limit the maximum braking force which can be applied by the brake in either direction of rotation of said propeller shaft for each position of the brake applying means, a secondary brake comprising a wheel brake, said secondary brake comprising self-limiting brake shoe elements automatically operable to limit the maximum braking force which can be applied by the secondary brake for each position of brake applying means and means for applying said secondary brake due to braking reaction from the primary brake, the last mentioned means constituting the sole actuating means for said secondary brake.

5. In a wheeled vehicle, a propeller shaft for driving the rear wheels of the vehicle, a primary brake comprising a brake drum mounted on said propeller shaft, a brake carriage mounted to turn about said shaft, brake shoes pivoted on said carriage, manually operable means for moving said brake shoes to engage said drum, said means comprising parts operable to diminish the engaging pressure of said brake shoes upon rotational movement of said brake carriage in either direction, a secondary brake for braking the front wheels of the vehicle, linkage including elastic members for causing turning movement of said carriage to apply said secondary brake, said linkage constituting the sole applying means for the secondary brake, retarding springs associated with the frame of the vehicle for absorbing the reaction due to initial movement of said carriage whereby to prevent application of the secondary brake until a predetermined retarding force is applied to the rear wheels of the vehicle, said secondary brake comprising self-limiting brake shoe elements for automatically limiting the maximum braking force which can be applied by the secondary brake for each position of said linkage.

6. In a wheeled vehicle, a propeller shaft for driving the rear wheels of the vehicle, a primary brake comprising a brake drum mounted on said propeller shaft, a brake carriage mounted to turn about said shaft, brake shoes pivoted on said carriage, brake applying means comprising a curved actuating member eccentric with respect to said brake drum and a brake shoe applying part adapted to move along said curved member upon rotation of said carriage whereby to effect a predetermined maximum braking force for each position of said curved member, a secondary brake for applying retarding force to the front wheels of the vehicle, linkage including elastic members for causing turning movement of said carriage to apply said secondary brake, said linkage constituting the sole applying means for the secondary brake, and retarding springs associated with the frame of the vehicle for absorbing the reaction due to initial movement of said carriage whereby to prevent application of the secondary brake until a predetermined retarding force is applied to the rear wheels of the vehicle, said retarding springs having greater strength than said elastic members whereby to permit initial movement of said carriage without application of said secondary brake and said secondary brake comprising self-limiting brake shoe elements for automatically limiting the maximum braking force which can be applied by the secondary brake for each position of said linkage.

FREDRIK LJUNGSTRÖM.